March 1, 1927.

H. W. G. SALINGER 1,619,041

DUPLEX ARRANGEMENT FOR TELEGRAPH CABLES

Filed Feb. 8, 1926

H. W. G. Salinger
INVENTOR

By: Marks & Clerk
ATTYs

Patented Mar. 1, 1927.

1,619,041

UNITED STATES PATENT OFFICE.

HANS WERNER GEORG SALINGER, OF BERLIN, GERMANY.

DUPLEX ARRANGEMENT FOR TELEGRAPH CABLES.

Application filed February 8, 1926, Serial No. 86,954, and in Germany January 31, 1925.

Figure 1:
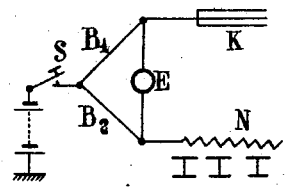

Duplex operation on telegraph lines and cables is rendered possible by the use of differential and bridge arrangements. These two arrangements are mainly based on the principle of the Wheatstone bridge. Fig. 1 of the accompanying drawings illustrates by way of example the bridge arrangement, K being the cable, N its artificial counterpart, $B_1$ $B_2$ the arms of the bridge, E the receiver, and S the transmitter. The bridge arms $B_1$, $B_2$ may for instance be constructed as blocking condensers, and may in addition thereto contain resistances, etc.

Figure 2:
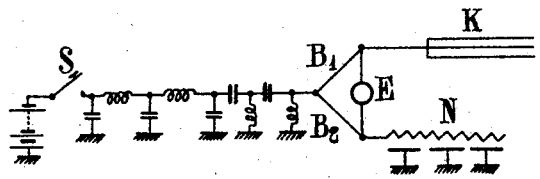

It has been found advantageous in the operation of long telegraph lines, to insert, between the key S and the corner point of the bridge, circuits which improve the shape of the current. The reason therefor is that the telegraph signs may be considered to be a superposition of sinusoidal elementary waves; for the operation, only waves of a limited frequency range are required; the other waves are immaterial, they increase, however, the balancing of the bridge and therefore they may even be detrimental. An example of such an arrangement is illustrated in Fig. 2. Such an arrangement has the disadvantage that it absorbs a rather substantial part of the transmitting voltage. A further portion of the transmitting voltage is absorbed in the arms of the bridge so that the voltage reaching the cable K is substantially reduced as compared with that of the transmitting battery.

These voltage losses are substantially reduced according to the present invention by the arms $B_1$, $B_2$ of the bridge being so constructed that they also effect a filtering of the transmitting current.

Figure 3:
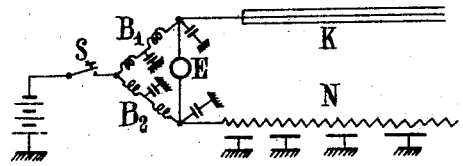
Figure 4:
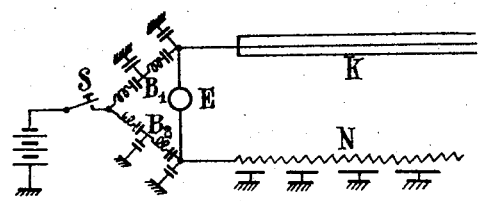

One form of carrying the invention into effect is illustrated in Fig. 3 and another form in Fig. 4, it being, however, understood that other arrangements are possible without departing from the spirit of the invention.

It will be seen that in these arrangements the same members act as arms of the bridge and at the same time as filters of the transmitting voltage, so that the voltage loss hereinbefore referred to takes place only once and not twice.

The invention has the following further advantage. It has been pointed out above that the frequencies which are not used for the operation are detrimental. This has led to the introduction of filtering arrangements also in the receiving branch, in order to keep the said frequencies away from the sensitive part of the arrangement viz, the receiver. Also in this case the voltage loss is detrimental, this time with respect to the receiving current.

In arrangements according to the present invention, these "receiving-filters" (this expression is not intended to cover specifically the so-called filters used in telephony, but merely to denote the function of the arrangement) may be despensed with or be essentially simplified, whereby the losses are reduced also with respect to the receiving current. That this is really the case, can be ascertained in a very simple way by considering the operation, for instance of the arrangements illustrated in Figs. 3 and 4. Their filtering effect is based on the fact that they constitute a very strong short circuit for those waves which they do not allow to pass. In consequence thereof, the receiver is short-circuited as regards those waves of the receiving current which are not desired, that is to say, these arrangements have at the same time a filtering effect on the currents received over the cable.

What I claim is:—

Duplex arrangement for telegraph cables comprising a Wheatstone bridge, the cable and an artificial line constituting two arms thereof and means capable of improving the shape of the transmitted current being inserted in the two other resistance arms of the bridge and being such that they allow the passage of transmitted currents of the desired frequency without substantially reducing the received currents of the same frequency and that they do not allow the passage of transmitted currents of undesired frequencies and form a short circuit for the receiver as regards these frequencies.

In testimony whereof I have signed my name to this specification.

Dr. HANS WERNER GEORG SALINGER.